(12) United States Patent
Gordon et al.

(10) Patent No.: US 7,650,859 B2
(45) Date of Patent: Jan. 26, 2010

(54) WATER HEATER AND SYSTEM FOR INSULATING SAME

(75) Inventors: Michael Gordon, Grand Rapids, MI (US); James J. Robertson, Middleville, MI (US); Jason Sutherland, Hastings, MI (US); David Foster, Middleville, MI (US); Jeremy Waller, Grand Rapids, MI (US)

(73) Assignee: Bradford White Corporation, Ambler, PA (US)

( * ) Notice: Subject to any disclaimer, the term of this patent is extended or adjusted under 35 U.S.C. 154(b) by 146 days.

(21) Appl. No.: 11/873,107

(22) Filed: Oct. 16, 2007

(65) Prior Publication Data

US 2009/0095234 A1 Apr. 16, 2009

(51) Int. Cl.
*B65D 25/34* (2006.01)
*F24H 9/02* (2006.01)

(52) U.S. Cl. .................. 122/19.2; 220/694.1
(58) Field of Classification Search ............... 122/19.2, 122/494; 126/344; 220/567.3, 694.1
See application file for complete search history.

(56) References Cited

U.S. PATENT DOCUMENTS

| | | | |
|---|---|---|---|
| 4,477,399 A | 10/1984 | Tilton | |
| 4,956,909 A | 9/1990 | Nelson | |
| 4,957,097 A | 9/1990 | Chevalier et al. | |
| 4,985,106 A * | 1/1991 | Nelson | 156/276 |
| 4,998,970 A | 3/1991 | Nelson | |
| 5,002,709 A * | 3/1991 | Chevalier et al. | 264/46.5 |
| 5,023,031 A | 6/1991 | West et al. | |
| 5,040,697 A * | 8/1991 | Nelson | 220/567.3 |
| 5,209,368 A | 5/1993 | Bradenbaugh | |
| 5,213,728 A | 5/1993 | Hickman | |
| 5,421,475 A | 6/1995 | Nelson | |
| 5,509,566 A | 4/1996 | Nelson | |
| 5,711,256 A * | 1/1998 | Brandon | 122/19.2 |

\* cited by examiner

*Primary Examiner*—Gregory A Wilson
(74) *Attorney, Agent, or Firm*—RatnerPrestia

(57) ABSTRACT

A water heater and method of assembling the water heater are disclosed. The method includes the step of positioning an insulation member around a water tank. An expandable tube is positioned at an elevation between a top surface and a bottom surface of the insulation member. An outer shell is positioned over the water tank, the insulation member, and the expandable tube to at least partially encapsulate the water tank. The expandable tube is expanded to compress at least a portion of the insulation member against the water tank or the outer shell. Foam insulation is delivered into a space defined adjacent the top surface of the insulation member and between the water tank and the outer shell. The foam insulation is substantially limited from traveling past the expandable tube when the expandable tube is maintained in an expanded state.

26 Claims, 2 Drawing Sheets

WATER HEATER AND SYSTEM FOR INSULATING SAME

TECHNICAL FIELD

The present invention relates to water heaters, and more specifically, to a method and apparatus for insulating water heaters.

BACKGROUND OF THE INVENTION

Conventional water heaters typically include a water storage tank, a cylindrical outer casing or jacket concentrically positioned around the water storage tank, and an annular cavity disposed therebetween. Foam insulation is typically injected into the annular cavity to significantly reduce the escapement of thermal energy from the water storage tank to the surrounding environment. It is desirable to limit the escapement of thermal energy in an effort to reduce operating costs of the water heater.

For example, U.S. Pat. No. 5,023,031 to West et al., which is incorporated herein by reference in its entirety, discloses a method of insulating a water heater with an expandable foam insulating material. The foam is injected into the annular space between the water tank and the outer jacket. The foam is injected into a sleeve, which acts to confine the foam during its most liquid state, positioned within this space.

U.S. Pat. No. 4,477,399 to Tilton, which is incorporated herein by reference in its entirety, discloses a method for insulating a water heater with foamed insulation comprising the step of inflating a tube in the cavity between the shell and the tank to define a boundary for the cavity into which the insulating material is injected. The device is deflated after the foamed insulation has set in the cavity.

Despite the foregoing improvements, there is a continuing need to further develop methods and apparatuses for insulating electric and gas fired water heaters in the interest of energy conservation.

SUMMARY OF THE INVENTION

According to an aspect of the invention, a method of assembling a water heater is provided. The method includes the step of positioning an insulation member around a water tank. An expandable tube is positioned at an elevation between a top surface and a bottom surface of the insulation member. An outer shell is positioned over the water tank, the insulation member, and the expandable tube to at least partially encapsulate the water tank. The expandable tube is expanded to compress at least a portion of the insulation member against the water tank or the outer shell. Foam insulation is delivered into a space defined adjacent the top surface of the insulation member and between the water tank and the outer shell. The foam insulation is substantially limited from traveling past the expandable tube when the expandable tube is maintained in an expanded state.

According to another aspect of the invention a water heater is provided. The water heater comprises a water tank and an outer shell surrounding the water tank. An insulation member is positioned in a space defined between the water tank and the outer shell. The insulation member includes a top surface and a bottom surface. An expandable tube is positioned in the space defined between the water tank and the outer shell at an elevation between the top surface and the bottom surface of the insulation member. The expandable tube is sized to compress the insulation member in an expanded state.

BRIEF DESCRIPTION OF THE FIGURES

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figures 1, 2:
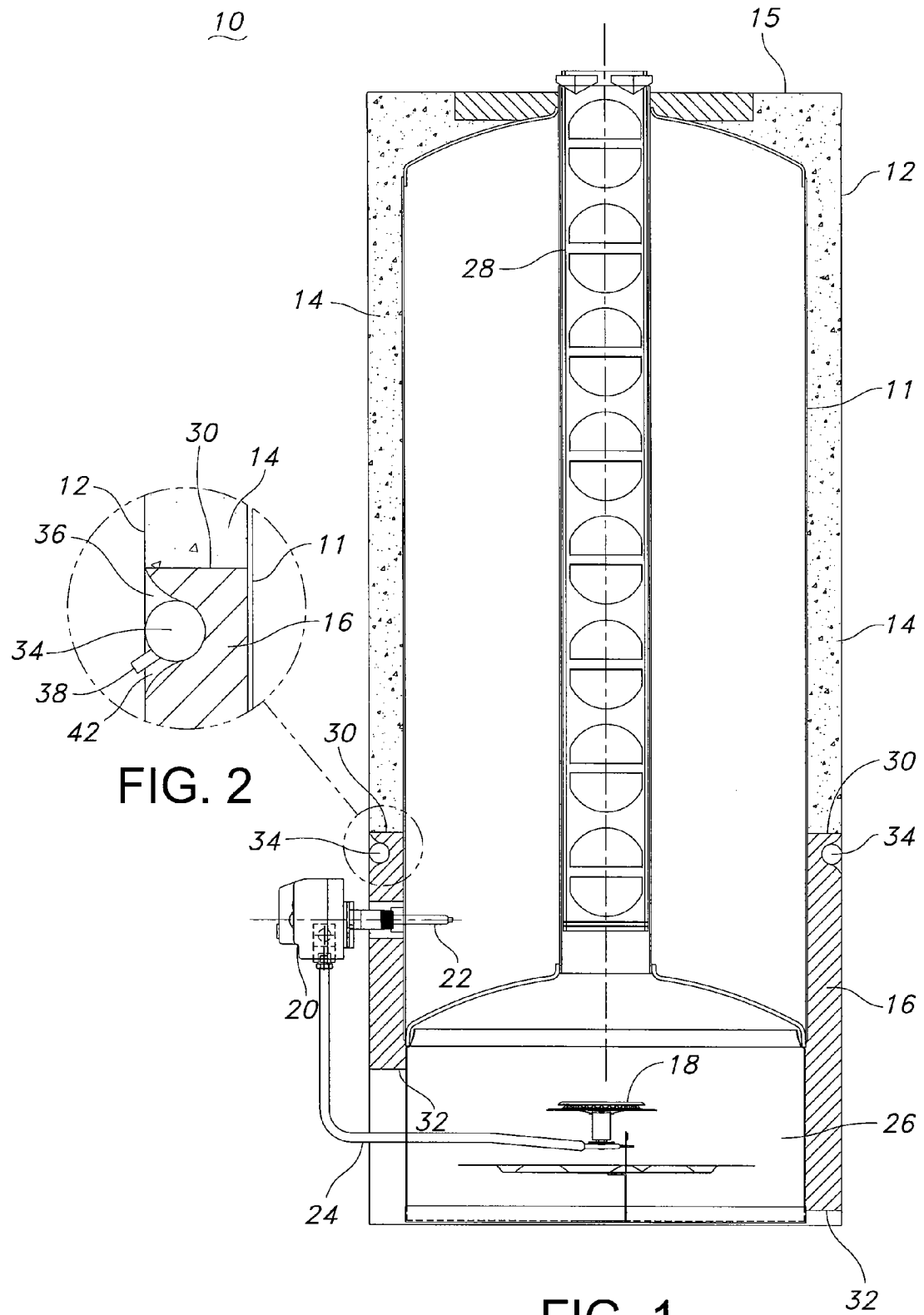
FIG. 1 depicts a cross-sectional elevation view of an exemplary embodiment of a gas-fired water heater according to an aspect of this invention.
FIG. 2 depicts a detailed view of the expanded tube of FIG. 1.

This invention will now be described with reference to several embodiments selected for illustration in the drawings. It will be appreciated that the scope and spirit of the invention are not limited to the illustrated embodiments.

Referring generally to the figures, and according to an aspect of the invention, a method of assembling a water heater 10 is provided. The method includes the step of positioning an insulation member 16, 50 around a water tank 11. An expandable tube 34, 44, 46 is positioned at an elevation between a top surface 30, 54 and a bottom surface 32 of the insulation member 16, 50. An outer shell 12 is positioned over the water tank 11, the insulation member 16, 50, and the expandable tube 34, 44, 46 to at least partially encapsulate the water tank 11. The expandable tube 34, 44, 46 is expanded to compress at least a portion of the insulation member 16, 50 against the water tank 11 and/or the outer shell 12. Foam insulation 14 is delivered into a space defined adjacent the top surface 30, 54 of the insulation member 16, 50 and between the water tank 11 and the outer shell 12. The foam insulation 14 is substantially limited from traveling past the expandable tube 34, 44, 46 when the expandable tube 34, 44, 46 is maintained in an expanded state.

According to another aspect of the invention a water heater 10 is provided. The water heater 10 comprises a water tank 11 and an outer shell 12 surrounding the water tank 11. An insulation member 16, 50 is positioned in a space defined between the water tank 11 and the outer shell 12. The insulation member 16, 50 includes a top surface 30, 54 and a bottom surface 32. An expandable tube 34, 44, 46 is positioned in the space defined between the water tank 11 and the outer shell 12 at an elevation between the top surface 30, 54 and the bottom surface 32 of the insulation member 16, 50. The expandable tube 34, 44, 46 is sized to compress the insulation member 16, 50 in an expanded state.

Referring specifically to FIG. 1, an exemplary embodiment of a water heater is designated by the numeral "10." The water heater 10 comprises a water tank 11 for containing water, an outer shell 12 for encapsulating the water tank 11, and an annular cavity formed between the water tank 11 and the outer shell 12. Foam insulation 14 and an insulation member 16 are provided in the annular cavity to limit the escapement of thermal energy from the water storage tank 11 to the surrounding environment.

Foam insulation 14 is injected and distributed throughout the annular cavity to substantially reduce the escapement of thermal energy from the tank 11. The foam insulation 14 may be composed of polyurethane or any other suitable thermally insulating foam material. A top cover 15 is fastened to the outer shell 12, thereby enclosing the top surface of the water storage tank 11. The top cover provides apertures to accommodate a flue tube 28, a cold water inlet fitting (not shown), and a hot water outlet fitting (not shown).

According to this exemplary embodiment, the water heater 10 is gas-fired. The gas-fired water heater 10 includes a control unit 20 having a gas valve and thermostat. A thermocouple 22 extending from the control unit 20 measures the water temperature inside the water tank 11. Apertures are provided in the outer shell 12, the insulation member 16, and the water tank 11 to accommodate the thermocouple 22. In operation, the control unit 20 compares the temperature reported by the thermocouple 22 with the temperature setting of the thermostat (set by the user) and adjusts the amount of gas provided to a gas burner 18 accordingly. The gas burner 18 receives gas via a gas line 24. The gas burner 18 is positioned in a combustion chamber 26 that is disposed beneath the water storage tank 11. A pilot is positioned adjacent the gas burner 18 within the combustion chamber 26 for igniting the gas. The products of combustion are carried along a flue 28 that is positioned within the interior of the tank 11.

Thermal energy is generated within the combustion chamber 26 for distribution to the contents of the water storage tank 11. The flue 28 is configured to transfer the thermal energy from the combustion chamber 26 to the water contained within the tank 11. Cold water is introduced into the water storage tank 11 through a cold water inlet fitting (not shown), and hot water is delivered from the tank 11 through a hot water outlet fitting (not shown).

As will be appreciated by those skilled in the art, the invention disclosed herein is not limited to gas-fired water heaters. Many of the details of this invention may also apply to electric water heaters, or any other type of heat exchanger or insulated tank.

The insulation member 16, a cross-section of which is shown in FIG. 1, is positioned about the bottom end portion of the water storage tank 11 in the vicinity of the combustion chamber 26. The insulation member may be positioned about the entire perimeter of the water tank 11, or a portion of the perimeter, if so desired. The insulation member 16 limits the injected foam insulation 14 from entering the combustion chamber 26, as the foam insulation 14 may be flammable or may damage components internal to the combustion chamber 26, such as the gas burner 18.

According to one exemplary method of assembling the water heater 10, the insulation member 16 may be applied to the exterior of the water tank 11 using an adhesive, if so desired. The insulation member 16 may be a flat rectangular sheet of fiberglass insulation, for example, that is provided in roll form. As discussed in greater detail later, the insulation member 16 is preferably formed from a material that is capable of deformation and able to return to its original shape. The ends of the insulation member 16 may be abutted, overlapped and subsequently stapled together. A suitable air set adhesive is currently sold and distributed by H.B. Fuller of St. Paul, Minn., USA (Product Number WB-0801), for example.

The insulation member 16 includes a top surface 30 and a bottom surface 32. The top surface 30 of the insulation member 16 abuts the foam insulation 14. The top surface 30 may be substantially straight, and the bottom surface 32 may be non-continuous to accommodate one or more openings in the combustion chamber 26, as shown in FIG. 1.

The water heater 10 of FIG. 1 includes an expandable tube 34 for limiting the passage of foam insulation 14 beyond the top surface 30 of the insulation member 16 or beyond the expandable tube 34. The expandable tube 34 may be provided for preventative measures to limit or prevent the passage of foam insulation 14 into the combustion chamber 26. In an expanded state, as shown in FIG. 2, the tube 34 compresses the insulation member 16 against the water tank 11 and/or the outer shell 12. The tube 34 optionally extends about the entire perimeter of the insulation member 16 (and/or the water tank 11). Generally, the expandable tube 34 may be positioned at any elevation between the top surface 30 and the bottom surface 32 of the insulation member 16.

FIG. 2 depicts a detailed view of an expandable tube 34. The expandable tube 34 is positioned at a location proximal to an interface between the insulation member 16 and the foam insulation 14. Stated in different terms, the expandable tube 34 is positioned at a location proximal to the top surface 30 of the insulation member 16.

According to the exemplary embodiment illustrated in FIG. 2, the expandable tube 34 is positioned between the insulation member 16 and the interior surface of the outer shell 12. Expanding the tube 34 (e.g., by inflating or otherwise expanding the tube by introducing fluid such as air into the tube) deforms insulation member 16 by compressing it against the outer shell 12.

An annular gap 36 consequently forms between the tube 34 and the interior surface of the outer shell 12. The foam insulation 14 may accumulate within the annular gap 36 and along the exterior surfaces of the tube 34. An annular gap 42 also forms between the tube 34 and the interior surface of the outer shell 12. The foam insulation 14 is limited or prevented from traveling beyond the interface between the tube 34 and the outer shell 12 into the annular gap 42.

The tube 34 may be a single-wall tube capable of inflation and deflation. Alternatively, the tube 34 may include an inner tube (not shown) and an outer tube. The tube 34 may optionally include a valve stem 38 for delivering air into the tube 34, as shown in FIG. 2. The valve stem 38 may also be utilized for releasing air from the tube 34. The outer shell 12 may optionally include an aperture to provide user access to the valve stem 38. Alternatively, a hose 40 may be coupled to the tube for delivering or releasing air (or any other fluid) from the tube, as described in greater detail with reference to FIG. 4. The tube 34 may be filled with air or any other gas or liquid, including foam insulation 14. Additionally, the tube 34 is not limited to air tubes, as the tube may be any type of selectively expandable vessel.

Figure 3:
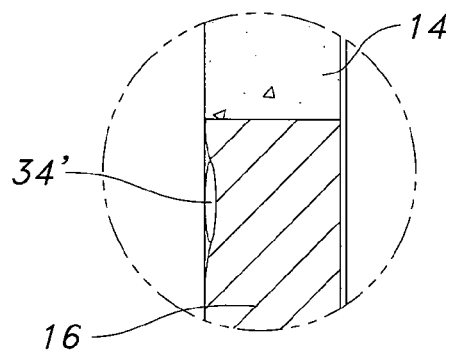
FIG. 3 depicts another detailed view of the expandable tube of FIG. 2, wherein the tube is shown in a deflated state according to another aspect of this invention.

FIG. 3 depicts a contracted tube 34'. The prime designation indicates that the tube 34 is in a contracted state (e.g., deflated). Upon contraction or deflation of the tube 34, the insulation member 16 returns to its original shape consequently compressing the foam insulation 14 amassed within gap 36. By positioning the tube 34 between the top surface 30 and the bottom surface 32 of the insulation member 16, the entire length of the water heater 10 is insulated by either the insulation member 16 or the foam insulation 14. Alternatively, by placing the tube between the insulation member and the solidified foam insulation, as shown in U.S. Pat. No. 5,213,728 to Hickman, for example, a portion of the height of the water heater is not adequately insulated resulting in undesired heat loss.

Figure 4:
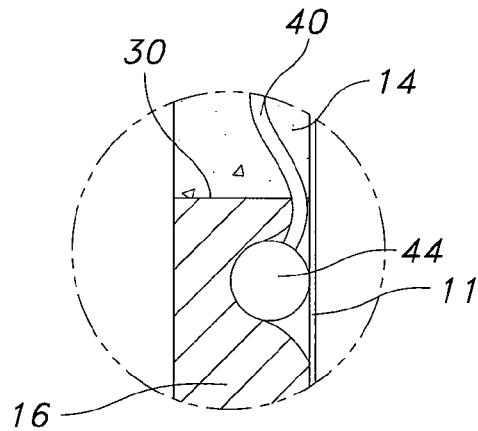
FIGS. 4 and 5 depict alternative arrangements of the expandable tube of FIG. 2, according to other aspects of the invention.

FIG. 4 depicts an alternative arrangement of an expandable tube 44 positioned within the water heater 10, according to another exemplary embodiment of the invention. In this alternative arrangement, the expandable tube 44 is positioned between the water tank 11 and the insulation member 16. In this arrangement the top surface 30 of the insulation member 16 may not be adhered to the water tank 11 in order to accommodate the tube 44. Alternatively, the insulation member 16 may be adhered to the outer shell 12 (as opposed to the water tank 11).

The expandable tube 44 includes an air hose 40, for example, for delivering air into or releasing air out of the tube 44. The hose 40 may be positioned through the annular space between the water tank 11 and the outer shell 12 (as shown) and draped over the exterior wall of the outer shell 12. Accordingly, the free end (not shown) of the hose 40 is suspended over the shell 12. Upon assembling the water heater, the free end of the hose 40 may be manually coupled to an air pump (not shown) for delivering or extracting air from the tube 44.

In this exemplary embodiment, the tube 44 is expanded to compress the insulating member 16 against the outer shell 12. The foam insulation 14 is limited or prevented from traveling beyond the interface between the tube 44 and the water tank 11. Although not shown, the tube 44 may also be positioned between the outer shell 12 and the insulation member 16.

Figure 5:
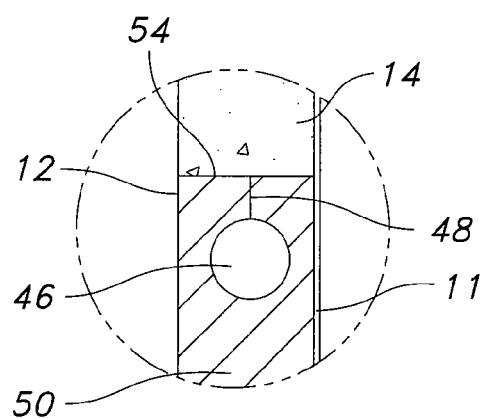

FIG. 5 depicts another alternative arrangement of an expandable tube 46 positioned within the water heater 10, according to yet another exemplary embodiment of the invention. In this alternative arrangement, the expandable tube 46 is positioned within an interior portion of an insulating member 50. The insulating member 50 may include a slit or opening 48 extending from the top surface 54 (and/or bottom surface) for accommodating the expandable tube 46. Although not shown, the tube 46 may include a hose (similar to hose 40) for delivering or extracting air therefrom.

In this alternative embodiment, the tube 46 is expandable for compressing one side of the insulating member 50 against the water tank 11, and simultaneously compress the opposing side of the insulating member 50 against the outer shell 12. In this regard, the application of pressure on both sides of the insulating member 50 may be useful for limiting or preventing the passage of foam insulation 14 on either side of the insulating member 50.

Referring back to FIGS. 1 and 2, the water heater 10 of the exemplary embodiment may be assembled in the manner described hereinafter, however it should be appreciated that the water heater 10 may be assembled in a variety of different ways and the method is not limited to any particular step or sequence of steps, which are optionally performed in any order. The insulation member 16 is first positioned around and adhered to the water tank 11. An adhesive may be applied to the insulation member 16 or the water tank 11.

The expandable tube 34 is positioned at an elevation between a top surface 30 and a bottom surface 32 of the insulation member 16. The outer shell 12 is positioned over the water tank 11, the insulation member 16 and the tube 34. The outer shell 12 at least partially encapsulates the water tank 11, the insulation member 16 and the tube 34. The outer shell 12 is fastened to the water storage tank 11 using any sufficient fastening means.

The expandable tube 34 is expanded to compress at least a portion of the insulation member 16 against the water tank 11 or the outer shell 12. The tube 34 may be expanded by inflating it with air, or other means, via the valve stem 38. Alternatively, if the tube includes a hose (such as hose 40), air is distributed through the inlet end of the hose to expand the tube.

Foam insulation 14 is then delivered into a space defined above the insulation member 16 and between the water tank 11 and the outer shell 12. Although not shown, a jacket or apron may be provided to facilitate the flow of foam throughout the annular space. The foam insulation 14 travels down through the annular space between the water tank 11 and the outer shell 12.

The foam insulation 14 initially travels along the perimeter of the top surface 30 of the insulation member 16. The foam insulation accumulates along the perimeter of the top surface 30 of the insulation member 16 and into the gap 36. The foam insulation 14 is substantially limited from traveling past the expandable tube 34 when the expandable tube 34 is maintained in an expanded state. The foam insulation 14 then amasses and rises throughout the annular cavity defined between the water tank 11 and the outer shell 12. It is at this point that the foam insulation 14, in its liquid state could potentially penetrate the insulation member 16. However, the interface between the expanded tube 34 and the outer shell 12 limits such penetration. Additionally, the adhesive barrier between the water tank 11 and the insulation member 16 (if provided) also limits the passage of foam insulation 14 between the water tank 11 and the insulation member 16.

Once the foam insulation 14 hardens sufficiently, the expandable tube 34 is optionally contracted (e.g., deflated). The insulation member 16 thereafter returns to its original shape. If the water heater includes a hose 40 for distributing air (or other fluid) into the expandable tube 34, the hose 40 may be severed at the top of the water heater 10 and removed. Alternatively, the hose 40 may be placed on top of the hardened foam insulation 14. The top cover 15 is fastened to the top end of the water heater 10 thereby sealing the internal contents of the water heater 10. The water heater 10 may then be readied for shipment.

The foam insulation 14 may be composed of a variety of materials. A variety of foamed insulation, which is particularly suitable, is that commonly referred to as polyurethane foam. Polyurethane foam is prepared by combining a gas forming component and a liquid component. The gas forming component is usually a liquid in the polyol component and may be Freon-11®. The liquid components are mixed just before injecting into the cavity to be insulated with the foam. When the components are mixed, there is a heat of reaction which causes a vaporization of Freon-11® to commence foaming of the material. The foam insulation 14 may be Stepanfoam® RI-9645, which is an open cell and dimensionally stable foam insulation in the free-rise state. Stepanfoam® RI-9645 is derived from a blend of polyester and polyether polyols, a silicone surfactant, an amine catalyst, a cell opener, a dispersing agent and water. The foam is commercially available from Stepan Company, Northfield, Ill., USA.

The insulation member 16 may be a flat rectangular sheet of fiberglass insulation, for example, that is provided in roll form. The insulation member 16 may also be formed from other insulative batting materials known in the art.

The expandable tube 34 may be formed of a rubber material which has its surface treated with a release agent, so as to release from the set foamed insulation. Such treatment may include the use of a wax silicone or a laminate layer of polyethylene on the surface of the tube 34 which will readily release from the set foam.

Although the invention is illustrated and described herein with reference to specific embodiments, the invention is not intended to be limited to the details shown. Rather, various modifications may be made in the details within the scope and range of equivalents of the claims and without departing from the spirit of the invention. It will further be appreciated that the drawings are not rendered to any particular proportion or scale. The invention is not limited to any particular dimensions, materials, or other details of the illustrated embodiments.

What is claimed:

1. A method of assembling a water heater comprising the steps of:
   positioning an insulation member around a water tank;
   positioning an expandable tube at an elevation between a top surface and a bottom surface of the insulation member;
   positioning an outer shell over the water tank, the insulation member, and the expandable tube to at least partially encapsulate the water tank;
   expanding the expandable tube to compress at least a portion of the insulation member against the water tank or the outer shell; and
   delivering foam insulation into a space defined adjacent the top surface of the insulation member and between the water tank and the outer shell, wherein the foam insulation is substantially limited from traveling past the expandable tube when the expandable tube is maintained in an expanded state.

2. The method of claim 1 further comprising the step of contracting the expandable tube to permit the insulation member to at least partially return to a pre-compressed shape.

3. The method of claim 1, wherein the step of positioning the expandable tube further comprises the step of positioning the expandable tube at a location proximal to the top surface of the insulation member.

4. The method of claim 1, wherein the step of positioning the expandable tube further comprises the step of positioning the expandable tube at a location proximal to an interface between the insulation member and the foam insulation.

5. The method of claim 1, wherein the step of positioning the inflatable tube further comprises the step of positioning the inflatable tube at a location between the outer shell and the insulation member.

6. The method of claim 1, wherein the step of positioning the expandable tube further comprises the step of positioning the expandable tube at a location between the water tank and the insulation member.

7. The method of claim 1, wherein the step of positioning the expandable tube further comprises the step of positioning the expandable tube within an interior portion of the insulation member.

8. The method of claim 1, wherein the step of positioning the expandable tube further comprises the step of positioning the expandable tube about a perimeter of the water tank.

9. The method of claim 1, wherein the step of expanding the expandable tube comprises the step of inflating the expandable tube.

10. A water heater comprising:
    a water tank;
    an outer shell surrounding the water tank;
    an insulation member positioned in a space defined between the water tank and the outer shell, the insulation member having a top surface and a bottom surface; and
    an expandable tube positioned in the space define between the water tank and the outer shell at an elevation between the top surface and the bottom surface of the insulation member, the expandable tube being sized to compress the insulation member in an expanded state.

11. The water heater of claim 10, wherein the expandable tube is positioned at a location between the outer shell and the insulation member.

12. The water heater of claim 10, wherein the expandable tube is positioned at a location between the water tank and the insulation member.

13. The water heater of claim 10, wherein the expandable tube is positioned within an interior portion of the insulation member.

14. The water heater of claim 10, wherein the expandable tube is positioned at a location proximal to the top surface of the insulation member.

15. The water heater of claim 10, wherein the expandable tube is positioned about a perimeter of the water tank.

16. The water heater of claim 10, wherein the expandable tube is inflatable.

17. The water heater of claim 10, further comprising foam insulation positioned adjacent the top surface of the insulation member in the space defined between the water tank and the outer shell.

18. The water heater of claim 17, wherein a combination of the insulation member and the foam insulation extend continuously along the entire height dimension of the water tank.

19. The water heater of claim 17, wherein the insulation member abuts the foam insulation.

20. The water heater of claim 10, wherein the insulation member is a sheet of insulation.

21. The water heater of claim 20, wherein the sheet of insulation is formed from fiberglass.

22. The water heater of claim 10 further comprising a combustion chamber positioned beneath the water tank, wherein the insulation member is positioned around the combustion chamber.

23. The water heater of claim 10, wherein the expandable tube includes a inlet port for the passage of fluid into the expandable tube.

24. The water heater of claim 23, wherein the expandable tube further includes a passageway coupled to the inlet port for delivering the fluid to or from the expandable tube.

25. The water heater of claim 24, wherein the passageway extends at least partially through the space defined between the water tank and the outer shell.

26. The water heater of claim 24, wherein the passageway extends through an opening in the outer shell.

* * * * *